United States Patent
Nishio et al.

(10) Patent No.: US 8,530,018 B2
(45) Date of Patent: Sep. 10, 2013

(54) ION EXCHANGER AND METHOD OF PRODUCING THE SAME

(75) Inventors: Kazunori Nishio, Shunan (JP); Eiji Asada, Shunan (JP); Toshio Aritomi, Shunan (JP); Masayuki Adachi, Shunan (JP)

(73) Assignee: Astom Corporation, Tokyo (JP)

( * ) Notice: Subject to any disclaimer, the term of this patent is extended or adjusted under 35 U.S.C. 154(b) by 0 days.

(21) Appl. No.: 13/203,363

(22) PCT Filed: Mar. 24, 2010

(86) PCT No.: PCT/JP2010/055075
§ 371 (c)(1),
(2), (4) Date: Aug. 25, 2011

(87) PCT Pub. No.: WO2010/110311
PCT Pub. Date: Sep. 30, 2010

(65) Prior Publication Data
US 2011/0305861 A1 Dec. 15, 2011

(30) Foreign Application Priority Data

Mar. 25, 2009 (JP) ................. 2009-074263

(51) Int. Cl.
*B32B 1/08* (2006.01)
*C08L 23/06* (2006.01)
(52) U.S. Cl.
USPC .......................................... 428/36.9; 521/28
(58) Field of Classification Search
USPC ............... 521/25, 28, 38; 252/184; 525/212, 525/221; 428/36.9
See application file for complete search history.

(56) References Cited

U.S. PATENT DOCUMENTS

| 5,049,253 A | 9/1991 | Izuo et al. |
| 5,346,924 A * | 9/1994 | Giuffrida ........................ 521/28 |

FOREIGN PATENT DOCUMENTS

| EP | 1101790 A1 * | 5/2001 |
| JP | 2-259000 A | 10/1990 |
| JP | 2657525 B2 | 11/1996 |
| JP | 9-124805 A | 5/1997 |
| JP | 2001-294685 A | 10/2001 |

OTHER PUBLICATIONS

International Search Report for PCT/JP2010/055075 dated Apr. 27, 2010.

* cited by examiner

*Primary Examiner* — Gwendolyn Blackwell
*Assistant Examiner* — Susan R Dye
(74) *Attorney, Agent, or Firm* — Birch, Stewart, Kolasch & Birch, LLP

(57) ABSTRACT

[Problems] To provide an ion exchanger having excellent electric properties, a low electric resistance, excellent mechanical strength and, at the same time, having excellent contamination resistance.
[Means for Solution] An ion exchanger comprises a melt-extrusion-formed body of a resin composition containing a granular ion-exchange resin and a low-melting polyolefin resin having a melting point of not higher than 170° C., the melt-extrusion-formed body: (a) containing the granular ion-exchange resin at a ratio of not less than 30% by weight but less than 50% by weight, and the low-melting polyolefin resin in an amount of more than 100 parts by weight but not more than 150 parts by weight per 100 parts by weight of the granular ion-exchange resin; (b) having a melt index in a range of 1 to 5 g/10 min. as measured at 190° C.; and (c) having a water content of not less than 30%.

1 Claim, No Drawings

U S 8,530,018 B2

ION EXCHANGER AND METHOD OF PRODUCING THE SAME

TECHNICAL FIELD

This invention relates to an ion exchanger and a method of producing the same. More specifically, the invention relates to the ion exchanger obtained by extrusion forming and is preferably applied to the electrodeposition coating, and to a method of producing the same.

BACKGROUND ART

The ion exchanger has been widely used for a variety of applications in the form of films (i.e., in the form of ion-exchange films), such as a film for electrodialysis for concentrating the brine, desalting the saline water, and separating ionic substances from nonionic substances, and a diaphragm for electrolyzing alkali metal salt-containing aqueous solutions and organic solutions.

The above ion exchanger had heretofore been generally used in the form of flat films but, in recent years, has often been used in the form of tubes. When the ion exchanger is used in the form of a flat film, there occurs such an inconvenience that the ion exchanger occupies an increased installation area in the electrolytic cell (e.g., electroplating bath or electrodeposition bath). When used in the form of a tube, however, the ion exchanger occupies a decreased portion in the electrolytic cell. When used in the form of the flat film, further, ribs must be used to support the flat film to prevent the film from deforming, or gaskets or spacers must be used among the neighboring films resulting in a decrease in the effective film area that contributes to exchanging ions, or permitting foreign matters in the treated solution to adhere to the ribs, gaskets or spacers, arousing such problems that the blocking easily occurs and, hence, requiring the washing thereof and cumbersome disassembling operation. The tubular ion exchanger, on the other hand, requires no special member for supporting the ion exchanger or for preventing the deformation thereof and, therefore, maintains a sufficiently large effective ion exchange area offering such advantages as little blocking, easy washing and easy disassembling operation.

However, the tubular ion exchanger has a problem in that it is difficult to maintain both the mechanical strength and the electric properties. That is, the ion exchanger of this form is, usually, formed by using, as a starting material, a resin composition containing a granular ion-exchange resin and a thermoplastic resin that serves as a binder, and melt-extruding the resin composition. Therefore, the surfaces of the granular ion-exchange resin are covered with the thermoplastic resin without having ion-exchanging property and, therefore, the electric properties such as ion-exchange capacity, etc. are deteriorated (i.e., the film exhibits an increased resistance). To avoid such an inconvenience, the granular ion-exchange resin may be used in an increased amount and the thermoplastic resin which is the binder may be used in a decreased amount. In this case, however, the mechanical strength decreases and, for example, deformation is easily caused by fluid pressure or the like accompanied by such a problem that water permeates through during the use.

There has also been proposed a tubular ion exchanger maintaining both the mechanical strength and the electric properties. For example, a patent document 1 is proposing a tubular ion exchanger obtained by mixing a polyethylene type resin having a melt index of not more than 2 g/10 min. and a granular ion-exchange resin at a weight ratio of 3:7 to 5:5, and extrusion-forming the mixture into the form of a tube.

PRIOR ART DOCUMENT

Patent Document

Patent document 1: Japanese Patent No. 2557525

OUTLINE OF THE INVENTION

Problems that the Invention is to Solve

The tubular ion exchanger proposed by the patent document 1 uses a polyethylene type resin having a small melt index (MI) as a binder resin, sets the amount of the granular ion-exchange resin and the amount of the binder resin (low-MI polyethylene type resin) at a predetermined ratio to suppress the thermal decomposition of the ion-exchange groups at the time of extrusion forming, suppresses a decrease in the amount of the ion-exchange groups that lose the ion-exchange capacity as the surfaces of the granular ion-exchange resin are covered with the binder resin and, as a result, realizes both favorable electric properties (small resistance of the film) and mechanical strength.

However, though the tubular ion exchanger of the patent document 1 is satisfactory with regard to excellent electric properties and mechanical strength, it involves a new problem of a decrease in the contamination resistance. That is, to maintain both electric properties and mechanical strength, the patent document 1 uses the granular ion-exchange resin in an increased amount and the polyethylene type resin of a low melt index as a binder resin causing, the surfaces of the extrusion-formed body to be roughened. As a result, the surfaces are easily contaminated due to the adhesion of foreign matter. This problem turns out to be a serious defect when the ion exchanger is used for the electrodeposition coating. That is, in the electrodeposition coating, the treating solution contains fine masses of a coating material, and fine masses in the coating material adhered to the surfaces of the ion exchanger grow as the solid bodies coagulate, and solid matters of the coating material called lumps split off the surfaces of the ion exchanger and adhere to the material being coated. Occurrence of lumps can be effectively suppressed by washing the surfaces of the ion exchanger which, however, causes a great decrease in the productivity.

It is, therefore, an object of the present invention to provide an ion exchanger having excellent electric properties and mechanical strength and, at the same time, having excellent contamination resistance, and a method of producing the same.

Another object of the present invention is to provide an ion exchanger which is produced, specifically, by the extrusion forming and, specifically, has a tubular shape.

Means for Solving the Problems

According to the present invention, there is provided an ion exchanger comprising a melt-extrusion-formed body of a resin composition containing a granular ion-exchange resin and a low-melting polyolefin resin having a melting point of not higher than 170° C., the melt-extrusion-formed body satisfying the following conditions of:
(a) containing the granular ion-exchange resin at a ratio of not less than 30% by weight but less than 50% by weight, and the low-melting polyolefin resin in an amount of more than 100 parts by weight but not more than 150 parts by weight per 100 parts by weight of the granular ion-exchange resin;

(b) having a melt index in a range of 1 to 5 g/10 min. as measured at 190° C.; and (c) having a water content of not less than 30%.

In the ion exchanger of the present invention, it is desired that:

(1) The ion exchanger is of a tubular shape;

(2) The granular ion-exchange resin has a water content of more than 50%; and (3) The low-melting polyolefin resin is polyethylene.

According to the present invention, further, there is provided a method of producing an ion exchanger, including following steps of:

preparing a resin composition which contains a granular ion-exchange resin and a low-melting polyolefin resin having a melting point of not higher than 170° C., the granular ion-exchange resin being contained at a ratio of not less than 30% by weight but less than 50% by weight, and the low-melting polyolefin resin being contained in an amount of more than 100 parts by weight but not more than 150 parts by weight per 100 parts by weight of the granular ion-exchange resin, and the resin composition having a melt index in a range of 1 to 5 g/10 min. as measured at 190° C., and having a water content adjusted to be not less than 30%;

melt-extruding the resin composition to obtain an extrusion-formed body; and swell-treating the extrusion-formed body to adjust the water content thereof to be not less than 30%.

In the present invention, the water content of the ion exchanger stands for a saturated amount of water which can be absorbed by the ion exchanger and, concretely, the ratio of water content of when the ion exchanger is dipped in the brine at 60° C. for not less than 24 hours, and is calculated according to the following formula. Similarly, further, the water content of the ion-exchange resin stands for a saturated amount of water which can be absorbed by the ion-exchange resin and, concretely, the ratio of water content of when the ion-exchange resin is dipped in the brine at 25° C. for not less than 3 hours, and is calculated according to the following formula like the water content of the ion exchanger.

Water content (%)=[(A−B)/B]×100 wherein A is the weight of the ion exchanger of when it is dipped in the brine so as to absorb water until saturated and after excess of water on the outer surfaces is removed, and B is the weight of the ion exchanger in the dry state.

The water content of the ion exchanger can be adjusted by the ion-exchange capacity of the granular ion-exchange resin that is used and by the degree of crosslinking thereof. For example, the water content of the granular ion-exchange resin increases with an increase in the amount of the ion-exchange groups introduced into the granular ion-exchange resin, and decreases with an increase in the degree of crosslinking of the ion-exchange resin constituting the granules (with an increase in the ratio of the crosslinking monomer such as divinylbenzene or the like used for forming the resin). Therefore, the water content of the granular ion-exchange resin can be increased by forming the ion-exchange resin in a relatively loose structure by heightening the ion-exchange capacity by increasing the amount of the ion-exchange groups and, at the same time, by lowering the degree of crosslinking by decreasing the amount of the crosslinking monomer. The water content of the ion exchanger can be adjusted to lie in a suitable range by adjusting the amount of the low-melting polyolefin resin powder depending upon the water content of the granular ion-exchange resin.

Effects of the Invention

The ion exchanger of the present invention is produced by the melt-extrusion forming using, specifically, low-melting polyolefin resin having a melting point of not higher than 170° C. as a binder resin in combination with the granular ion-exchange resin, the granular ion-exchange resin being used in a relatively small amount (content of the granular ion-exchange resin being not less than 30% by weight but less than 50% by weight), the low-melting polyolefin resin being used in an amount larger than that of the granular ion-exchange resin, and the melt index (MI, 190° C.) of the melt-extrusion-formed body containing the granular ion-exchange resin and the binder resin (low-melting polyolefin resin) being set to lie in a range of 1 to 5 g/10 min (conditions (a) and (b) above). Therefore, the ion exchanger has a large mechanical strength and, at the same time, a highly smooth surface (e.g., the surface roughness Ra is not larger than 50 μm). As a result, the ion exchanger has very excellent contamination resistance and is capable of effectively preventing lumps from adhering on the surface of the ion exchanger even when, for example, the electrodeposition coating is continuously executed for extended periods of time.

The ion exchanger of the present invention having the above excellent mechanical strength and contamination resistance, further, features a low electric resistance. That is, despite the content of the granular ion-exchange resin is less than 50% by weight in the ion exchanger, the water content of the ion exchanger is adjusted to be not less than 30% owing to a high water content or, in other words, owing to a high water-containing capability of the granular ion-exchange resin. Therefore, the ion exchanger after extrusion-formed is in a dry state without containing water, but the ion-exchange resin contained therein has a high water-containing capability. When the ion exchanger is used being dipped in various kinds of brine solutions, therefore, the granular ion-exchange resin in the ion exchanger undergoes swelling to a large degree. As a result, fine gaps are formed between the granular ion-exchange resin and the binder resin (low-MI resin), and a treating solution containing salts infiltrates into the gaps to lower the electric resistance.

As described above, despite of being formed by the extrusion forming, the ion exchanger of the present invention features not only excellent electric properties and mechanical strength but also a highly smooth surface effectively preventing the adhesion of fine masses of the coating material contained in the treating solution and exhibiting excellent contamination resistance.

MODE FOR CARRYING OUT THE INVENTION

The ion exchanger of the invention is formed by melt-extrusion-forming an ion-exchange resin composition containing the granular ion-exchange resin and the low-melting polyolefin resin in amounts of a predetermined ratio and, further, containing a suitable additive, and has a water content adjusted to be not less than 30% and, specifically, to lie in a range of 30 to 40% and, further, having a melt index (190° C.) lying in a range of 1 to 5 g/10 min. and, specifically, 1 to 3 g/10 min.

<Granular Ion-Exchange Resins>

The granular ion-exchange resin is added to the ion-exchange resin composition that is subjected to the melt-extrusion forming in order to impart ion-exchange capacity to the ion exchanger of the invention. Basically, a known one is used.

In the invention, it is desired that the granular ion-exchange resin has a water content of more than 50% and, specifically, in a range of more than 50 but not more than 60%. By using the granular ion-exchange resin having a water content lying in the above range, the water content of the finally obtained ion exchanger can be adjusted to lie in the above range while using the granular ion-exchange resin and the low-melting resin in amounts in predetermined ranges.

The granular ion-exchange resin is produced by polymerizing a polymerizable monomer adapted to introducing the ion-exchange groups and a crosslinking monomer (crosslinking agent) together in the presence of a polymerization initiator to thereby introduce ion-exchange groups thereto and, finally, pulverizing the polymerized product so as to be adjusted to a suitable particle size.

As the polymerizable monomer adapted to introducing ion-exchange groups, there can be used any known monomer that has been used for forming ion-exchange resins as represented by styrene, vinyltoluene, vinylxylene, α-methylstyrene, acenaphthylene, vinylnaphthaline, α-styrene halide, α, β, β'-styrene trihalide, chlorostyrene and chloromethylstyrene.

When a granular cation-exchange resin is to be formed, in particular, it is desired to use α-vinyl halide sulfonic acid, α, β, β'-vinyl halide sulfonic acid, methacrylic acid, acrylic acid, styrenesulfonic acid, vinylsulfonic acid, maleic acid, itaconic acid, styrenephosphonylic acid, maleic anhydride, vinylphosphoric acid and salts or esters thereof.

When a granular anion-exchange resin is to be formed, further, there can be preferably used vinylpyridine, methylvinylpyridine, ethylvinylpyridine, vinylpyrrolidone, vinylcarbazole, vinylimidazole, aminostyrene, alkylaminostyrene, dialkylaminostyrene, trialkylaminostyrene, methylvinylketone, chloromethylstyrene, acrylic acid amide, acrylamide, oxime, styrene or vinyltoluene.

The above monomers may be used in one kind alone or in two or more kinds which are copolymerizable with each other in combination.

The crosslinking agent to be used in combination with the above polymerizable monomers works to enhance the strength of granules and to maintain stable the granular shape of the ion-exchange resin at the time of melt-extrusion forming. As the crosslinking agent, there can be used a divinyl type compound such as m-, p- or o-divinylbenzene, divinylsulfone, butadiene, chloroprene, isoprene, trivinylbenzene, divinylnaphthalene, diallylamine, triallylamine or divinylpyridine in one kind or in two or more kinds in combination.

The crosslinking agent is, usually, used in an amount of 5 to 150 parts by weight per 100 parts by weight of the monomer mentioned above. Here, the larger the amount of the crosslinking agent, the smaller the amount of water that permeates into the obtained granular ion-exchange resin and the smaller the water content of the granular ion-exchange resin (amount of water that can be absorbed). The smaller the amount of the crosslinking agent, on the other hand, the larger the amount of water that permeates into the obtained granular ion-exchange resin and the larger the water content of the granular ion-exchange resin. Therefore, the crosslinking agent is used in an amount that lies in the above-mentioned range so that the content of the granular ion-exchange resin lies in the above range (more than 50% and, specifically, more than 50 but not more than 60%).

Further, as the polymerization initiator, there can be used the known one such as an organic peroxide like benzoyl peroxide in a catalytic amount.

The ion-exchange groups can be introduced by known means such as sulfonation, haloalkylation, amination, phosphoniation, sulfoniation or hydrolysis depending, for example, upon the kind of the ion-exchange groups (cation-exchange groups or anion-exchange groups) to be introduced.

The amount of the ion-exchange groups to be introduced is, usually, such that the ion-exchange capacity is in a range of about 0.1 to about 20 meq/g and, specifically, about 0.5 to about 3 meq/g on the dry basis. The water content of the obtained granular ion-exchange resin increases with an increase in the ion-exchange capacity, and the water content thereof decreases with a decrease in the ion-exchange capacity. Therefore, the amount of the ion-exchange groups to be introduced is determined depending upon the amount of use of the above crosslinking agent so that the water content of the granular ion-exchange resin lies in the predetermined range (more than 50%, specifically, more than 50 but not more than 60%).

The ion-exchange groups are, usually, introduced after the polymerization of the polymerizable monomer with the crosslinking agent. Depending upon the cases, however, the polymerizable monomer can be polymerized with the crosslinking agent after the ion-exchange groups have been introduced into the polymerizable monomer.

The thus obtained ion-exchange resin having a large water content (more than 50%, specifically, more than 50 but not more than 60%) is pulverized and is, next, classified by using a mesh to obtain a granular material having a predetermined grain size.

In order for the granular ion-exchange resin to be homogeneously dispersed in a binder resin (low-melting resin) that will be described later, it is desired that the granular ion-exchange resin has an average grain size ($D_{50}$) in a range of about 0.01 to about 100 μm calculated as a volume as measured, for example, by the laser diffraction/light scattering method. If the grain size is too large, the granular ion-exchange resin is dispersed unhomogeneously in the ion exchanger causing the properties of the ion exchanger to be varied. If the grain size is too small, on the other hand, workability such as mixing decreases and, besides, the grains tend to be coagulated together. This, too, makes homogeneous dispersion difficult and properties of the ion exchanger tend to be varied.

<Low-Melting Resins>

The low-melting polyolefin resin to be used in combination with the above granular ion-exchange resin works as a binder, and is used for imparting a predetermined mechanical strength to the obtained ion exchanger.

In the present invention, it is important that the low-melting polyolefin resin has a melting point of not higher than 170° C. This is because if a high-melting resin is used as the binder resin, then the resin is heated to be higher than the melting point at the time of melt-extrusion forming, whereby the ion-exchange groups in the granular ion-exchange resin are thermally decomposed and, as a result, the ion-exchange capacity of the obtained ion exchanger decreases.

As the low-melting polyolefin resin having a melting point of not higher than 170° C., there can be used a thermoplastic resin without a functional group that is reactive with the ion-exchange group, i.e., a polyolefin resin or a modified polyolefin resin. As the polyolefin resin, there can be used, for example, a low-, intermediate- or high-density polyethylene, polypropylene, poly 1-butene, poly 4-methyl-1-pentene, or a random or block copolymer of α-olefins such as ethylene, propylene, 1-butene or 4-methyl-1-pentene. As the modified polyolefin resin, there can be used an α-olefin grafted with a vinyl type monomer such as acrylic acid or methacrylic acid.

Moreover, the low-melting polyolefin resin must have such a melt index (MI, 190° C.) that the MI (190° C.) of the ion-exchange resin composition to be subjected to the melt-extrusion is adjusted to lie in a predetermined range (1 to 5 g/10 min., specifically, 1 to 3 g/10 min.). Usually, therefore, the low-melting polyolefin resin having a melt index in a range of about 3 to about 7 g/10 min. is used. This is because if the MI of the ion-exchange resin composition lies outside the predetermined range, it becomes difficult to obtain the ion exchanger having desired properties. From the standpoint of the MI of adjustment, among the above low-melting polyolefin resins according to the present invention, it is desired to use a low-, intermediate- or high-density polyethylene, an ethylene copolymer having an ethylene content of not less than 50% by weight, or a reformed polyethylene by being grafted with a methacrylic acid or like acid.

<Other Additives>

The ion-exchange resin composition to be subjected to the melt-extrusion forming may be blended with any known additives within ranges in which they do not impair the object of the invention. Representative additives may be, for example, lubricant, stabilizer, antioxidant, etc.

As the lubricant, there can be exemplified hydrocarbons such as polyethylene wax and the like, aliphatic amides such as stearic acid amide and the like, and fatty acid esters such as butyl stearate and the like. As the stabilizer or the antioxidant, further, there can be exemplified those of the lead type such as dibasic stearic acid, and those of the calcium type, cadmium type, barium type, zinc type and tin type.

<Ion-Exchange Resin Composition>

The ion-exchange resin composition to be subjected to the melt-extrusion is prepared by mixing the above-mentioned components. The resin composition, however, must satisfy the conditions required for the ion exchanger that is obtained, i.e., (a) containing the granular ion-exchange resin at a ratio of not less than 30% by weight but less than 50% by weight, and the low-melting resin in an amount of not less than 100 parts by weight but not more than 150 parts by weight per 100 parts by weight of the granular ion-exchange resin;

(b) having an MI in a range of 1 to 5 g/10 min. and, specifically, 1 to 3 g/10 min. as measured at 190° C.; and (c) having a water content of not less than 30% and, specifically, in a range of 30 to 40%, to obtain the ion exchanger having a small electric resistance, excellent electric properties and mechanical strength and, at the same time, having excellent contamination resistance.

Concerning the above condition (a), if the amount of the granular ion-exchange resin in the resin composition is smaller than the above range, the ion-exchange properties of the obtained ion exchanger are impaired. For example, the obtained ion exchanger exhibits an increased electric resistance, the treating efficiency by the exchange of ions greatly decreases, and the ion exchanger becomes no longer usable. Further, if the granular ion-exchange resin is contained in the resin composition in amounts larger than the above range and if the low-melting polyolefin resin is used in amounts smaller than the above range, the ion exchanger exhibits a decreased mechanical strength and deteriorated surface smoothness and, therefore, possesses decreased contamination resistance.

Further, the above condition (b) related to the MI of the ion-exchange resin composition is a condition necessary specifically for maintaining favorable electrochemical properties yet forming smooth surfaces on the ion exchanger. If the MI is smaller than the above range, the fluidity of the resin composition becomes too low at the time of melt-extrusion forming hindering the surface smoothness of the ion exchanger which is the extrusion-formed body. If the MI is larger than the above range, the fluidity of the resin composition becomes too high. Therefore, the surfaces of the granular ion-exchange resin are completely covered with the low-melting polyolefin resin, and the electrochemical properties of the obtained ion exchanger are impaired.

The condition (c) related to the water content is a condition necessary for maintaining, specifically, the electric properties of the ion exchanger. So far as the water content lies in the above range, the obtained ion exchanger forms gaps between the granular ion-exchange resin and the low-melting polyolefin resin due to swelling upon absorbing water. A highly electrically conducting medium such as brine solution infiltrates into the space and, as a result, the electric resistance of the ion exchanger decreases, i.e., an increase in the electric resistance due to the use of the low-melting polyolefin resin is effectively suppressed. For instance, if the water content of the resin composition is smaller than 30%, the degree of swelling due to the absorption of water becomes small, no space is formed between the granular ion-exchange resin and the low-melting polyolefin resin into which the electrically conducting medium will infiltrate, and the ion exchanger having a low electric resistance cannot be obtained.

If the water content of the resin composition is unnecessarily large, the gap becomes too great between the granular ion-exchange resin and the low-melting polyolefin resin due to swelling causing such inconvenience as leakage of liquid. It is, therefore, desired that the water content of the resin composition is in the above-mentioned range (30 to 40%).

As will be understood from the above description, to prepare a resin composition that satisfies all of the above conditions (a) to (c), it becomes necessary to select a granular ion-exchange resin having a water content lying in the above-mentioned range and to select a low-melting polyolefin resin having an MI lying in a suitable range so as to satisfy the MI of the condition (b) and the water content of the condition (c), the granular ion-exchange resin and the low-melting resin being used in amounts satisfying the condition (a). Further, various additives are arbitrarily used in such amounts as will not impair the above conditions.

The components are mixed together by being melt-kneaded using, for example, an extruder. Here, the temperature for melt-kneading should not be higher than 150° C. If the temperature is too high, the ion-exchange groups possessed by the granular ion-exchange resin are thermally decomposed and extinguish to impair electric properties of the obtained ion exchanger.

<Ion Exchanger and its Production>

The ion exchanger of the present invention is obtained by melt-extruding the ion-exchange resin composition that satisfies the above conditions. The pellets obtained by melt-kneading by using, for example, an extruder are melt-extruded by being thrown into an extruder having a dies that meets the shape of the ion exchanger that is to be formed. In order to avoid thermal decomposition of the ion-exchange groups, the melt extrusion must be conducted at a temperature of not higher than 150° C. Though dependent, for example, upon the kind and the amount of use of the low-melting resin, the melt extrusion is, usually, carried out by setting the cylinder temperature of the extruder at 90 to 140° C. and the die temperature at 100 to 150° C.

The ion exchanger of the invention obtained by the melt extrusion satisfies the above-mentioned conditions (a) to (c) and exhibits excellent mechanical strength and electric properties despite it is formed by melt-extrusion forming by also using the low-melting polyolefin resin in combination and, further, features high surface smoothness and, therefore, excellent contamination resistance.

In order to realize excellent electric properties, the ion exchanger of the invention is swell-treated after it has been melt-extruded. Due to the swell-treatment, the water content reaches a saturated state (concretely, the water content rises to the water content of the above-mentioned level), and gaps are formed between the surfaces of the granular ion-exchange resin and the low-melting polyolefin resin. The swell-treatment is carried out by, for example, blowing hot water or by the dipped in hot water, the treatment time being from about several minutes to about several tens of hours. When the ion exchanger is being used, further, the swell-treatment may be carried out by the dipping in various kinds of brine solutions that are to be treated.

The ion exchanger of the present invention may assume any shape such as a flat film, tube or the like but, preferably, has a tubular shape from the standpoint of fabricating a treating vessel such as of electrolysis or dialysis in a compact size. It is, further, desired that the ion exchanger of the tubular shape has a thickness of from about 1 to about 5 mm from the standpoint of its self-standing performance and shape-holding performance.

As described above, further, the ion exchanger of the present invention has excellent surface smoothness. By exchanging the average surface roughness Ra (JIS-B-0601-1994) to be, for example, not more than 50 μm, it is made possible to effectively prevent lumps from adhering on the surfaces. As will be demonstrated in Examples appearing later, for example, no lump deposited on the surfaces of the ion exchanger even after the ion exchanger was continuously used for 6 months in the mounted testing for evaluation. Therefore, the ion exchanger of the present invention can be particularly preferably used in the field of electrodeposition coating where the occurrence of lumps could become a problem.

The surface having smoothness of a degree as described above can be realized by polishing the surface after the extrusion forming. However, the present invention makes it possible to obtain the surface of a high degree of flatness without conducting the treatment such as polishing the surface, and is very advantageous from the standpoint of productivity, too.

EXAMPLES

Excellent effects of the invention will now be described by way of the following Examples.

In the following Examples, various properties of the materials that were used and various properties of the obtained ion exchangers were evaluated by the methods described below.

Melt Index (MI):

10 Grams of an ion exchanger melt-extrusion-formed by using an ion-exchange resin and a low-melting polyolefin resin was cut into pieces of a size of not larger than 2 mm. Next, by using a small melt indexer manufactured by TECHNOL SEVEN Co., the ion exchanger was measured for its melt flow index at 190° C. (load: 2.16 kgf) in compliance with the JIS-K-6760.

Water Content:

(Water Content of the Ion-Exchange Resin)

The operation was repeated 3 times each for dipping the ion-exchange resin in a 1.0N sodium chloride aqueous solution for one hour, in order to completely exchange the counter ions to be of the $Cl^-$ type in the anion-exchange resin and to be of the $Na^+$ type in the cation-exchange resin.

Next, by using a messcylinder, 10 ml of the anion-exchange resin was correctly weighed, wrapped in a cloth, and was centrifugalized under the conditions of a diameter of 15 cm and a rotational speed of 3000 rpm for 5 minutes to remove the water. Thereafter, the anion-exchange resin was quickly transferred into a weighing bottle, and was hermetically sealed to obtain a correct wet weight. Thereafter, the resin was dried in a high-temperature drier heated at 105° C.±2° C. for 4 hours, and was left to cool in a desiccator for 30 minutes to measure the dry weight. The water content was calculated according to the following formula (1).

(Water Content of the Ion Exchanger)

The operation was repeated 3 times each for dipping the tubular ion exchanger obtained by melt-extrusion forming in a 1.0N sodium chloride aqueous solution of 60° C. for 8 hours, in order to completely exchange the counter ions in the ion exchanger to be of the $Cl^-$ type in the anion-exchange resin and to be of the $Na^+$ type in the cation-exchange resin. Next, the ion exchanger was cut into pieces of a predetermined size, water adhered on the surfaces thereof was removed with a cloth to a sufficient degree and, thereafter, the wet weight thereof was measured. Thereafter, the ion exchanger was dried in a high-temperature drier heated at 105° C.±2° C. for 4 hours, and was left to cool in a desiccator for 30 minutes to measure the dry weight. The water content was calculated according to the following formula (1).

$$\text{Water content (\%)} = (\text{wet weight (g)} - \text{dry weight (g)}) \times 100/\text{wet weight (g)} \quad (1)$$

Surface Roughness (Ra):

The tubular ion exchanger obtained by melt-extrusion forming was cut into square pieces of a size of about 1 cm and was measured for its 10-point average roughness by the non-contacting method by using a color 3D laser microscope VK-8700 manufactured by Keyence Co. in compliance with the JIS-B-0601-1994.

Contamination Resistance on the Film Surface:

The obtained tubular ion exchanger (6.3 cm in outer diameter, 200 cm in length) was subjected to the mounted testing by dipping it in an electrodeposition vessel for 6 months, and the deposition of lumps on the film surface before and after the test was confirmed with the naked eye.

Electric Resistance:

The tubular ion exchanger obtained by melt-extrusion forming was cut into square pieces of a size of about 2 cm, and the operation was repeated 3 times each for dipping the ion exchanger in a 0.5N sodium chloride aqueous solution for one hour, in order to completely exchange the counter ions in the film to be of the $Cl^-$ type in the anion exchanger and to be of the $Na^+$ type in the cation exchanger. Thereafter, the ion exchanger was measured for its electric resistance in the 0.5N sodium chloride aqueous solution by the alternating-current method under the conditions of a frequency of 1.0 kHz, a measuring area of 1 $cm^2$ and at 25° C.

Film Strength:

The tubular ion exchanger of a length of 10 cm was closed at its both ends with rubber plugs and was hermetically sealed with an adhesive. The interior of the tubular ion exchanger was filled with water through a penetration pipe provided in one rubber plug. Further, a hydraulic pressure was applied to measure a hydraulic pressure with which the tubular ion exchanger was broken as a breaking strength.

Example 1

A suspension copolymer of a styrene and a divinylbenzene (divinylbenzene content of 6% by weight) was chloromethylated and was, thereafter, quaternary ammoniated with a trimethylamine to prepare an anion-exchange resin (ion-exchange capacity of 3.0 meq/g) having a water content of 55%. The anion-exchange resin was dried at 60° C. for 16 hours, classified by using a sieve of 100 meshes, and the powdery component thereof that has passed through the sieve was used as the powdery anion-exchange resin.

The components of the following recipe:

| | |
|---|---|
| Anion-exchange resin powder | 100 parts by weight, |
| Low-density polyethylene powder | 110 parts by weight, |
| Calcium stearate | 3 parts by weight, and |
| Barium stearate | 1 part by weight, | were mixed together in advance to a sufficient degree, and the mixture was pelletized by a hot-cut method by using a knead-extruder.

The obtained pellets were put into an extruder of a cylinder temperature of 90 to 140° C. and a die temperature of 130 to 150° C., and were extrusion-formed by using a sizing plate device into a tube of an inner diameter of 30 mm, an outer diameter of 35 mm and a thickness of 2.5 mm.

The thus obtained tubular ion exchanger was dipped in a 0.2N sodium chloride aqueous solution of 60° C. for 24 hours so as to be swell-treated. Thereafter, the ion exchanger was measured for its water content, surface roughness, electric resistance and braking strength.

Table 1 shows the kinds, blending amounts and properties (water content, MI), etc. of the ion-exchange resins (IER) and the low-melting resins (PE) used for forming the extrusion-formed bodies, and Table 2 shows the results of measurements.

Example 2

A tubular ion exchanger was prepared in quite the same manner as in Example 1 but using a high-density polyethylene powder (HDPE) instead of the low-density polyethylene, and was measured for its water content, surface roughness, electric resistance and breaking strength.

The results were as shown in Tables 1 and 2.

Example 3

A suspension copolymer of a styrene and a divinylbenzene (divinylbenzene content of 8% by weight) was chloromethylated and was, thereafter, quaternary ammoniated with a trimethylamine to prepare an anion-exchange resin (ion-exchange capacity of 3.0 meq/g) having a water content of 52%. By using the ion-exchange resin, a tubular ion exchanger was prepared in the same manner as in Example 1 and was measured for its water content, surface roughness, electric resistance and breaking strength.

The results were as shown in Tables 1 and 2.

Example 4

A tubular ion exchanger was prepared in quite the same manner as in Example 1 but adding the low-density polyethylene powder in an amount of 150 parts by weight per 100 parts by weight of the ion-exchange resin powder, and was measured for its water content, surface roughness, electric resistance and breaking strength.

The results were as shown in Tables 1 and 2.

Example 5

A tubular ion exchanger was prepared in quite the same manner as in Example 1 but changing the kind of the low-density polyethylene powder and setting the MI of the mixture to be 4.5 g/10 min., and was measured for its water content, surface roughness, electric resistance and breaking strength.

The results were as shown in Tables 1 and 2.

Example 6

A suspension copolymer of a styrene and a divinylbenzene (divinylbenzene content of 6% by weight) was sulfonated to prepare a cation-exchange resin (ion-exchange capacity of 3.0 meq/g) having a water content of 55%. In other respects, a tubular ion exchanger was prepared in the same manner as in Example 1 and was measured for its water content, surface roughness, electric resistance and breaking strength.

The results were as shown in Table 1.

Comparative Example 1

A suspension copolymer of a styrene and a divinylbenzene (divinylbenzene content of 12% by weight) was chloromethylated and was, thereafter, quaternary ammoniated with a trimethylamine to prepare an anion-exchange resin (ion-exchange capacity of meq/g) having a water content of 40%. In other respects, a tubular ion exchanger was prepared in the same manner as in Example 1 and was measured for its water content, surface roughness, electric resistance and breaking strength.

The results were as shown in Tables 1 and 2.

Comparative Example 2

A tubular ion exchanger was prepared in quite the same manner as in Example 1 but adding the low-density polyethylene powder in an amount of 80 parts by weight per 100 parts by weight of the ion-exchange resin powder, and was measured for its water content, surface roughness, electric resistance and breaking strength.

The results were as shown in Tables 1 and 2.

Comparative Example 3

A tubular ion exchanger was prepared in quite the same manner as in Example 1 but changing the kind of the low-density polyethylene powder and setting the MI of the mixture to be 0.5, and was measured for its water content, surface roughness, electric resistance and breaking strength.

The results were as shown in Tables 1 and 2.

Comparative Example 4

A tubular ion exchanger was prepared in quite the same manner as in Example 1 but changing the kind of the low-density polyethylene powder and setting the MI of the mix ture to be 5.6, and was measured for its water content, surface roughness, electric resistance and breaking strength.

The results were as shown in Tables 1 and 2.

Comparative Example 5

A tubular ion exchanger was prepared in quite the same manner as in Example 6 but changing the kind of the low-density polyethylene powder and setting the MI of the mixture to be 0.7, and was measured for its water content, surface roughness, electric resistance and breaking strength.

The results were as shown in Tables 1 and 2.

TABLE 1

|  | Kind of IER | Kind of PE | Water content [%] | IER (pts. by wt.) | PE (pts. by wt.) | MI of mixture (g/10 min.) |
| --- | --- | --- | --- | --- | --- | --- |
| Ex. 1 | anion | LDPE | 55 | 100 | 110 | 1.5 |
| Ex. 2 | anion | HDPE | 55 | 100 | 110 | 1.1 |
| Ex. 3 | anion | LDPE | 52 | 100 | 110 | 1.5 |
| Ex. 4 | anion | LDPE | 55 | 100 | 150 | 3.0 |
| Ex. 5 | anion | LDPE | 55 | 100 | 110 | 4.5 |
| Ex. 6 | cation | LDPE | 55 | 100 | 110 | 1.5 |
| Comp. Ex. 1 | anion | LDPE | 40 | 100 | 110 | 1.5 |
| Comp. Ex. 2 | anion | LDPE | 55 | 100 | 80 | 0.8 |
| Comp. Ex. 3 | anion | LDPE | 55 | 100 | 110 | 0.5 |
| Comp. Ex. 4 | anion | LDPE | 55 | 100 | 110 | 5.6 |
| Comp. Ex. 5 | cation | LDPE | 55 | 100 | 110 | 0.7 |

TABLE 2

|  | Surface roughness [μm] | Contamination resistance (lumps formed) | Electric resistance [Ω · cm²] | Film strength [kgf/cm²] |
| --- | --- | --- | --- | --- |
| Ex. 1 | 28 | no | 175 | 4.8 |
| Ex. 2 | 32 | no | 97 | 4.3 |
| Ex. 3 | 28 | no | 201 | 4.7 |
| Ex. 4 | 23 | no | 278 | 5.1 |
| Ex. 5 | 21 | no | 421 | 5.5 |
| Ex. 6 | 18 | no | 139 | 4.6 |
| Comp. Ex. 1 | 29 | no | 859 | 4.7 |
| Comp. Ex. 2 | 53 | yes | 64 | 3.9 |
| Comp. Ex. 3 | 72 | yes | 98 | 2.8 |
| Comp. Ex. 4 | 20 | no | 1740 | 4.6 |
| Comp. Ex. 5 | 76 | yes | 87 | 4.3 |

The invention claimed is:

1. An ion exchanger comprising a melt-extrusion-formed body of a resin composition containing a granular ion-exchange resin and a low-melting polyolefin resin having a melting point of not higher than 150° C., said melt-extrusion-formed body satisfying the following conditions of:
   (a) containing said granular ion-exchange resin at a ratio of not less than 30% by weight but less than 50% by weight, and said low-melting polyolefin resin in an amount of more than 100 parts by weight but not more than 150 parts by weight per 100 parts by weight of said granular ion-exchange resin;
   (b) having a melt index in a range of 1 to 5 g/10 min, as measured at 190° C.; and
   (c) having a saturated water content of not less than 30% as calculated from the wet weight of the melt-extrusion-formed body after being dipped in 1.0N NaCl aqueous solution maintained at 60° C. for 24 hours and the dry weight thereof according to the following formula (1):

(wet weight−dry weight)×100/wet weight   (1);

wherein said low-melting polyolefin resin is polyethylene;
wherein said granular ion-exchange resin has a saturated water content of not less than 50%, and the saturated water content is calculated from the wet weight of the resin after being dipped in 1.0N NaCl aqueous solution maintained at 60° C. for 3 hours and the dry weight thereof according to the above formula (1);
wherein said ion exchanger has an average surface roughness of not more than 50 μm; and
wherein the ion exchanger is of a tubular shape.

* * * * *